(12) United States Patent
Akitomi

(10) Patent No.: US 11,372,379 B2
(45) Date of Patent: Jun. 28, 2022

(54) COMPUTER SYSTEM AND CONTROL METHOD

(71) Applicant: Hitachi, Ltd., Tokyo (JP)

(72) Inventor: Tomoaki Akitomi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 903 days.

(21) Appl. No.: 16/071,884

(22) PCT Filed: Oct. 14, 2016

(86) PCT No.: PCT/JP2016/080548
§ 371 (c)(1),
(2) Date: Jul. 20, 2018

(87) PCT Pub. No.: WO2018/070038
PCT Pub. Date: Apr. 19, 2018

(65) Prior Publication Data
US 2019/0025803 A1 Jan. 24, 2019

(51) Int. Cl.
*G06N 20/00* (2019.01)
*G05B 13/02* (2006.01)

(52) U.S. Cl.
CPC ....... *G05B 13/0265* (2013.01); *G05B 13/021* (2013.01); *G06N 20/00* (2019.01)

(58) Field of Classification Search
CPC ........ G06N 20/00; G06N 20/10; G06N 20/20; G06N 3/006; G05B 19/41815; G05B 13/021; G05B 13/0265
See application file for complete search history.

(56) References Cited

U.S. PATENT DOCUMENTS

| | | | |
|---|---|---|---|
| 2013/0176146 A1* | 7/2013 | Dusparic | G08G 1/07 340/907 |
| 2014/0135952 A1* | 5/2014 | Maehara | G05B 15/02 700/90 |

FOREIGN PATENT DOCUMENTS

JP 2014-099113 A 5/2014

OTHER PUBLICATIONS

Ribeiro et al., Interaction Models for Multiagent Reinforcement Learning, IEEE, CIMCA 2008, IAWTIC 2008, and ISE 2008, pp. 464-469 (Year: 2008).*

(Continued)

*Primary Examiner* — Li B. Zhen
*Assistant Examiner* — William Wai Yin Kwan
(74) *Attorney, Agent, or Firm* — Procopio, Cory, Hargreaves & Savitch LLP

(57) ABSTRACT

A computer system includes a processor and a memory connected to the processor, and manages pieces of reward function information for defining rewards for states and actions of the control targets for each of the control targets. The pieces of reward function information includes first reward function information for defining the reward of a first control target and second reward function information for defining the reward of a second control target. When updating the first reward function information, the processor compares the rewards of the first reward function information and the second reward function information with each other, specifies a reward, which is reflected in the first reward function information from rewards set in the second reward function information, updates the first reward function information on the basis of the specified reward, and decides an optimal action of the first control target by using the first reward function information.

7 Claims, 12 Drawing Sheets

(56) References Cited

OTHER PUBLICATIONS

Guisi et al., Reinforcement Learning with Multiple Shared Rewards, Procedia Computer Science 80, International Conference on Computational Science 2016, ICCS 2016, Jun. 6-8, 2016, pp. 855-864 (Year: 2016).*
Geramifard et al., A Tutorial on Linear Function Approximators for Dynamic Programming and Reinforcement Learning, Foundations and Trends in Machine Learning vol. 6, No. 4 (2013) pp. 375-454 (Year: 2013).*

* cited by examiner

[FIG. 1]
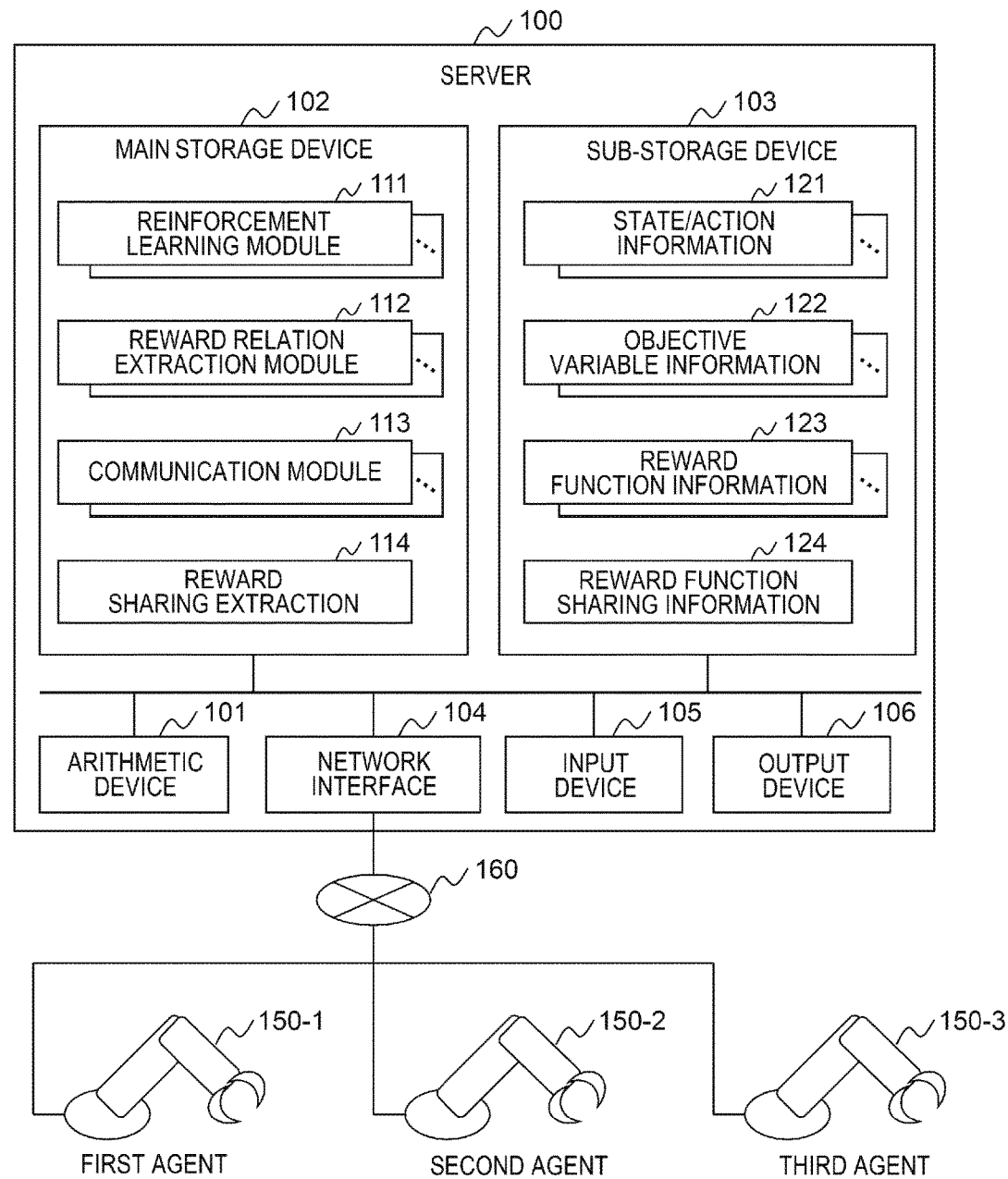

[FIG. 2]
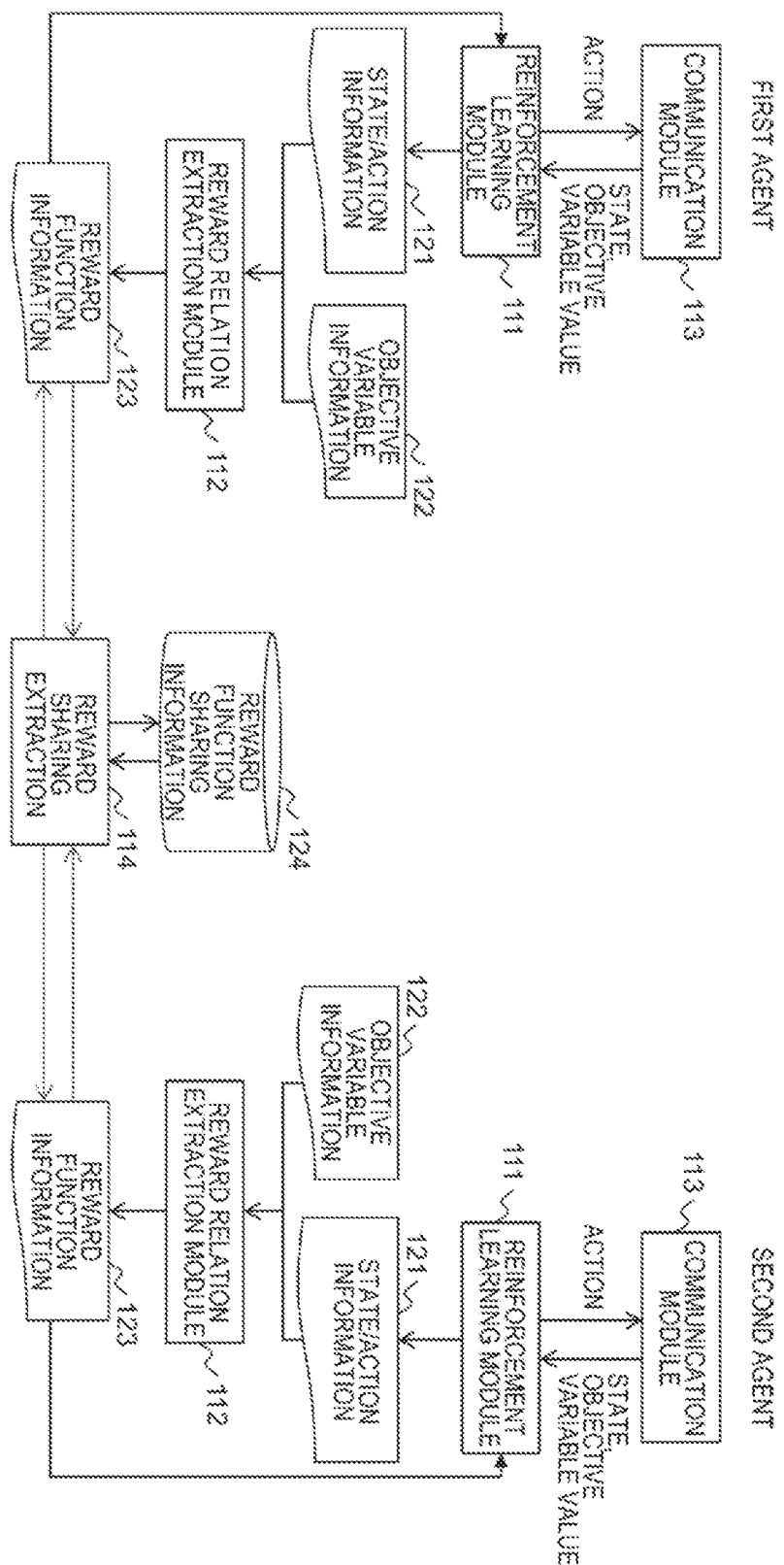

[FIG. 3]

STATE/ACTION INFORMATION 121

| EPISODE (301) | TIME (302) | STATE (303) | | | ACTION (304) |
|---|---|---|---|---|---|
| | | S1 | S2 | S3 | |
| E1 | T1 | S11 | S23 | S32 | A11 |
| E1 | T2 | S12 | S22 | S32 | A12 |
| E1 | T3 | S11 | S24 | S35 | A11 |
| E1 | T4 | S12 | S22 | S32 | A11 |
| E1 | T5 | S13 | S23 | S34 | A13 |
| E2 | T1 | S11 | S21 | S32 | A11 |
| ⋮ | ⋮ | ⋮ | ⋮ | ⋮ | ⋮ |

[FIG. 4]

OBJECTIVE VARIABLE INFORMATION 122

| EPISODE (401) | OBJECTIVE VARIABLE (402) |
|---|---|
| E1 | 0.5 |
| E2 | 0.4 |
| E3 | 1.5 |
| E4 | 1.2 |
| E5 | 0.1 |
| E6 | 0.7 |
| ⋮ | ⋮ |

[FIG. 5]

REWARD FUNCTION INFORMATION 123

| CONDITION ID | VARIABLE NAME | VALUE | REWARD | CONFIDENCE VALUE |
|---|---|---|---|---|
| C1 | S1 | S11 | 0.1 | 5% |
| C1 | S2 | S23 | 0.1 | 5% |
| C1 | A1 | A11 | 0.1 | 5% |
| C2 | S1 | S11 | 0.3 | 3% |
| C2 | S3 | S32 | 0.3 | 3% |
| C3 | S2 | S24 | 0.5 | 1% |
| ⋮ | ⋮ | ⋮ | ⋮ | ⋮ |

[FIG. 6]

REWARD FUNCTION SHARING INFORMATION 124

| AGENT ID | CONDITION | REWARD | CONFIDENCE VALUE |
|---|---|---|---|
| Ag1 | S1=S11 & S2=S23 & A1=A11 | 0.1 | 5% |
| Ag1 | S1=S13 & S3=S33 | 0.3 | 3% |
| Ag2 | S1=S11 & S2=S23 & A1=A12 | 0.25 | 1% |
| ⋮ | ⋮ | ⋮ | ⋮ |

[FIG. 7]
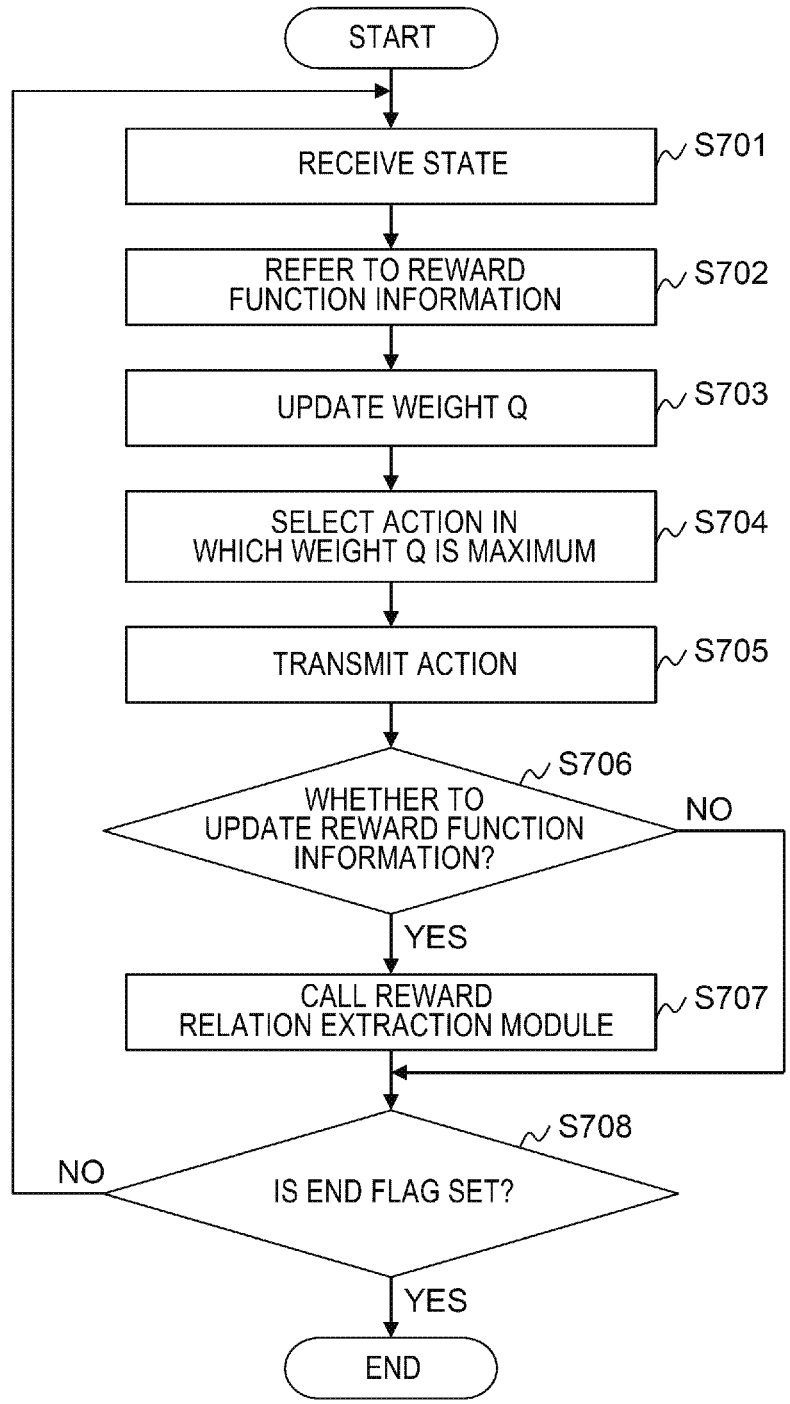

[FIG. 8]
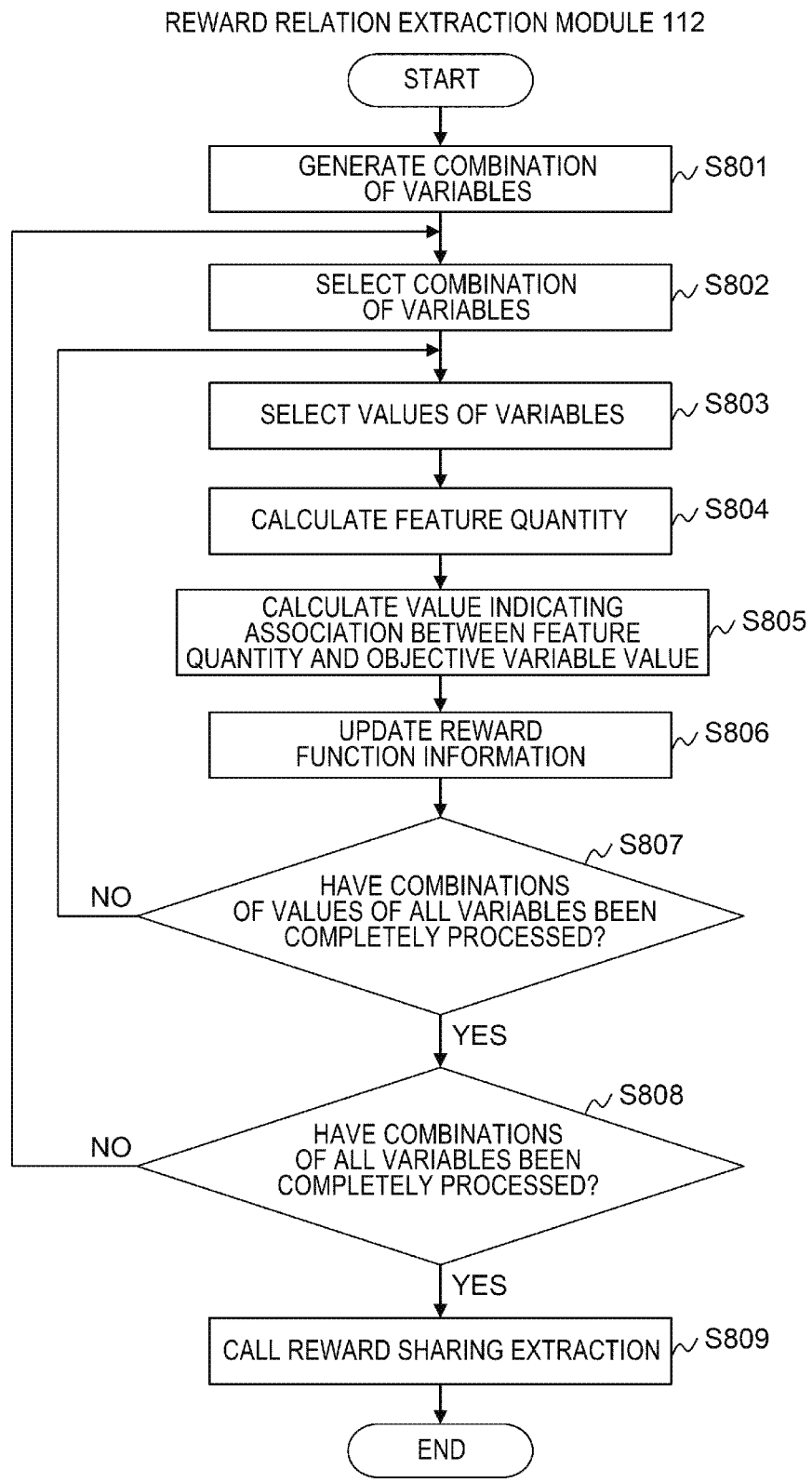

[FIG. 9]
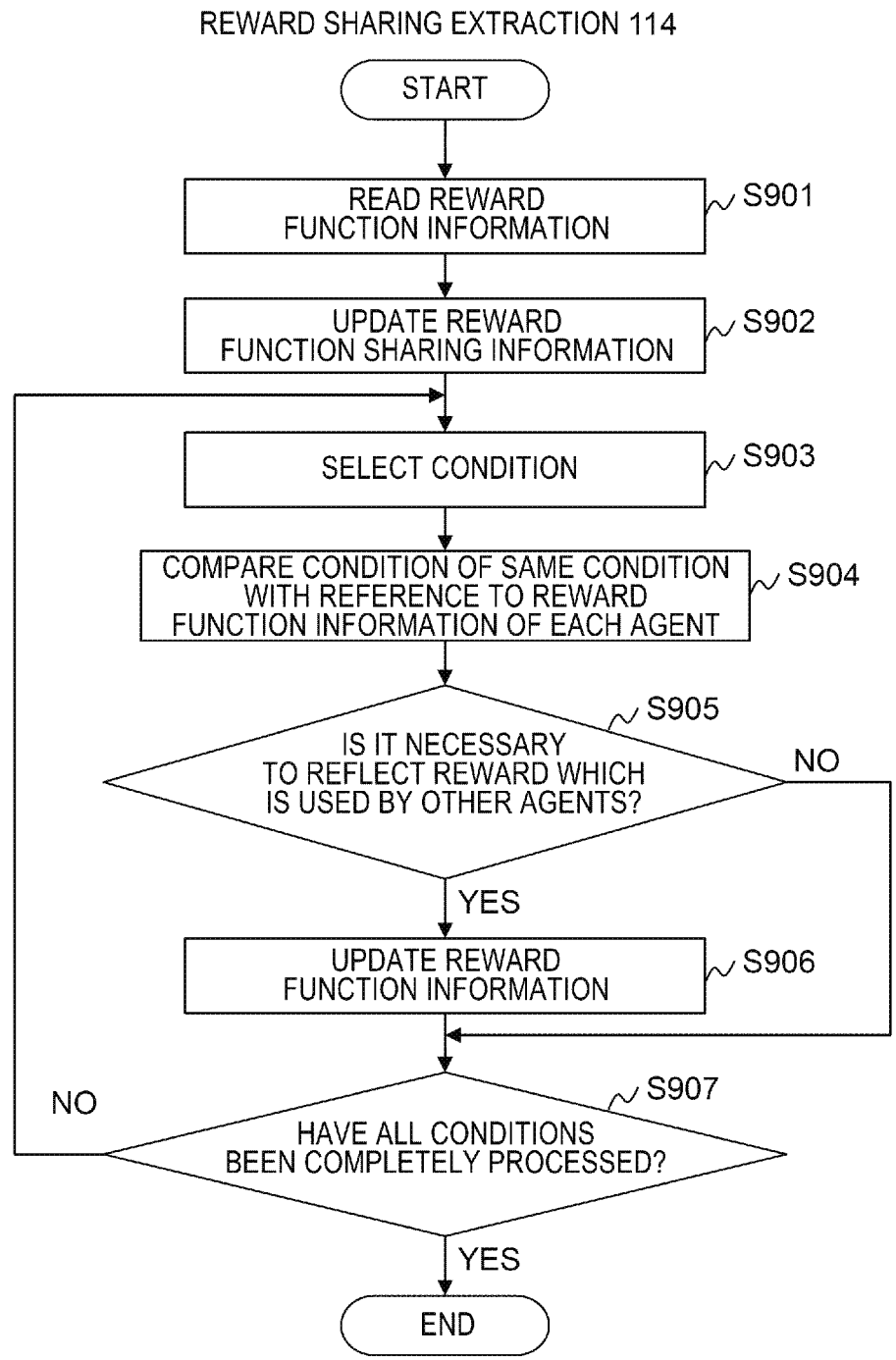

[FIG. 10]
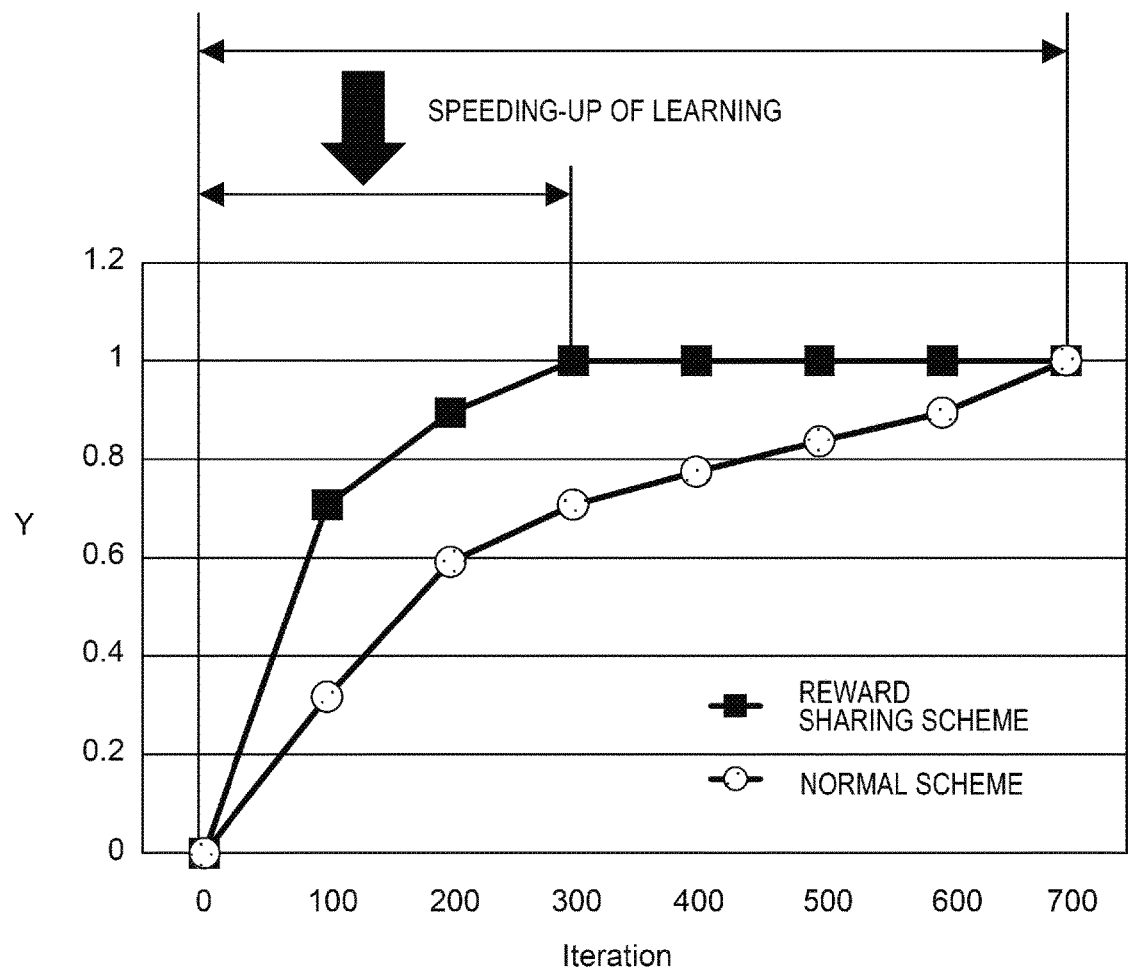

[FIG. 11]
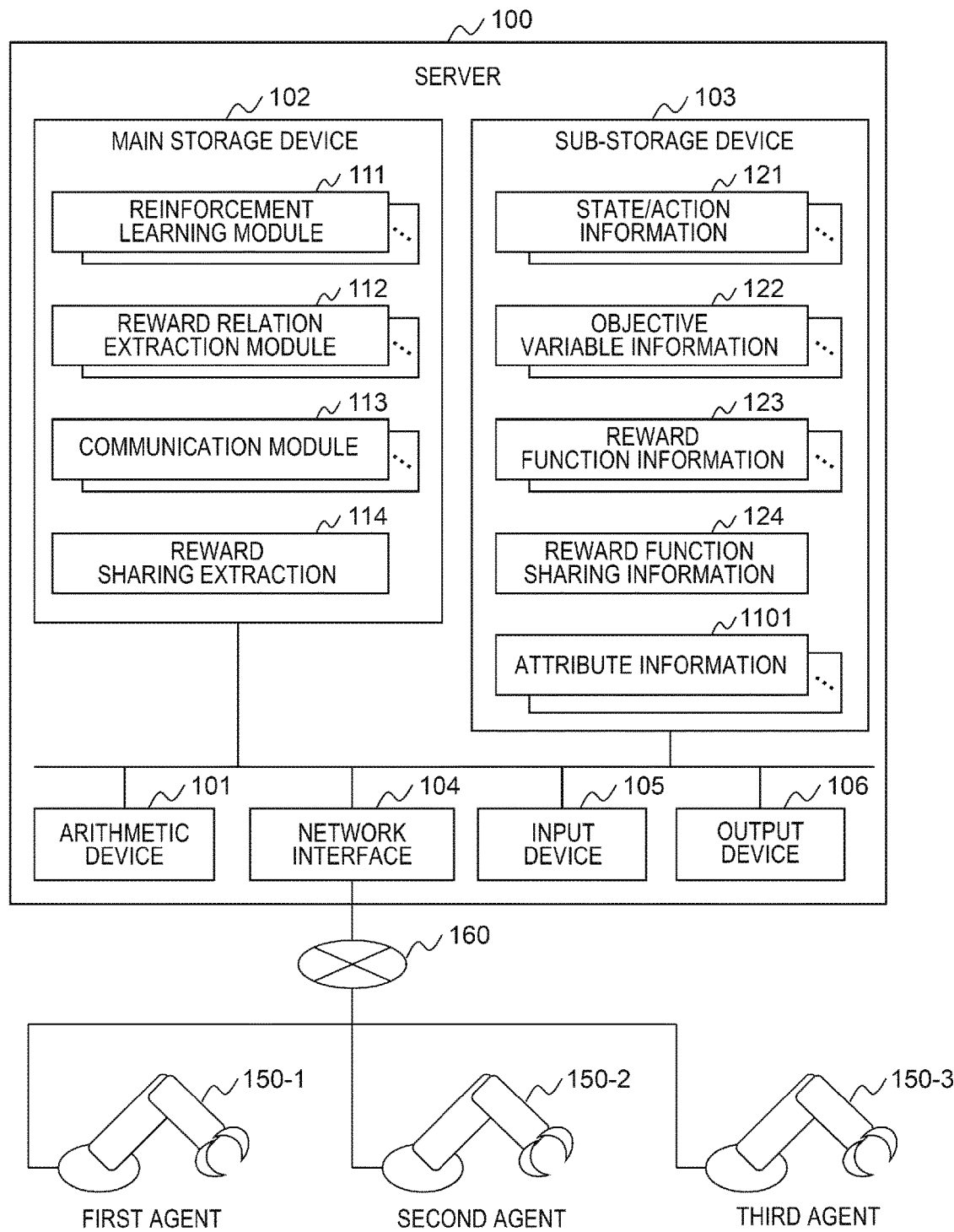

[FIG. 12]

ATTRIBUTE INFORMATION 1101

| VARIABLE NAME (1201) | INDEX (1202) | ATTRIBUTE (1203) |
|---|---|---|
| S1 | 1 | At1_1_C |
| S1 | 2 | At1_2_G |
| S2 | 1 | At2_1_A |
| S2 | 21 | At2_1_W |
| ⋮ | ⋮ | ⋮ |

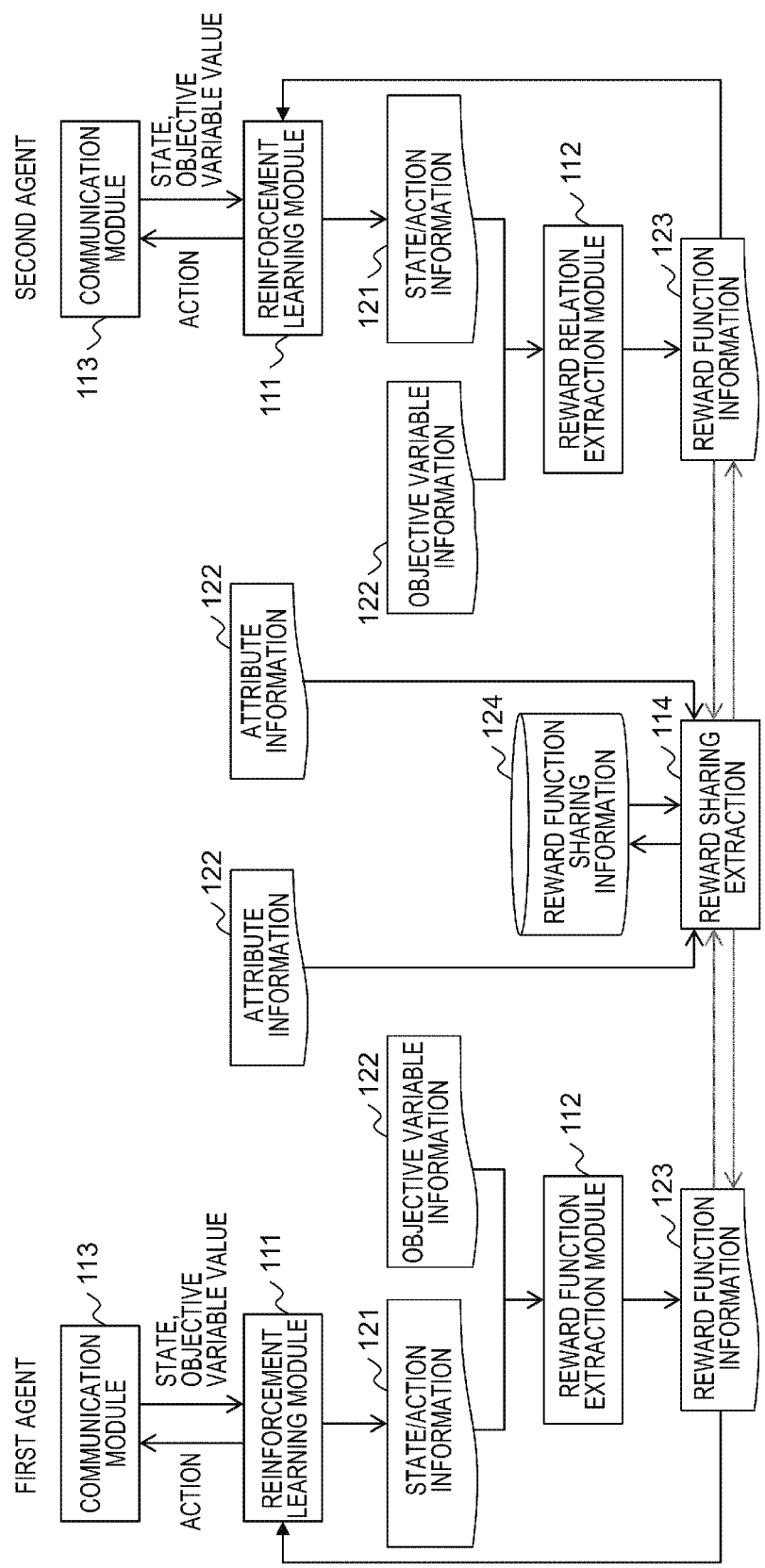
[FIG. 13]

[FIG. 14]
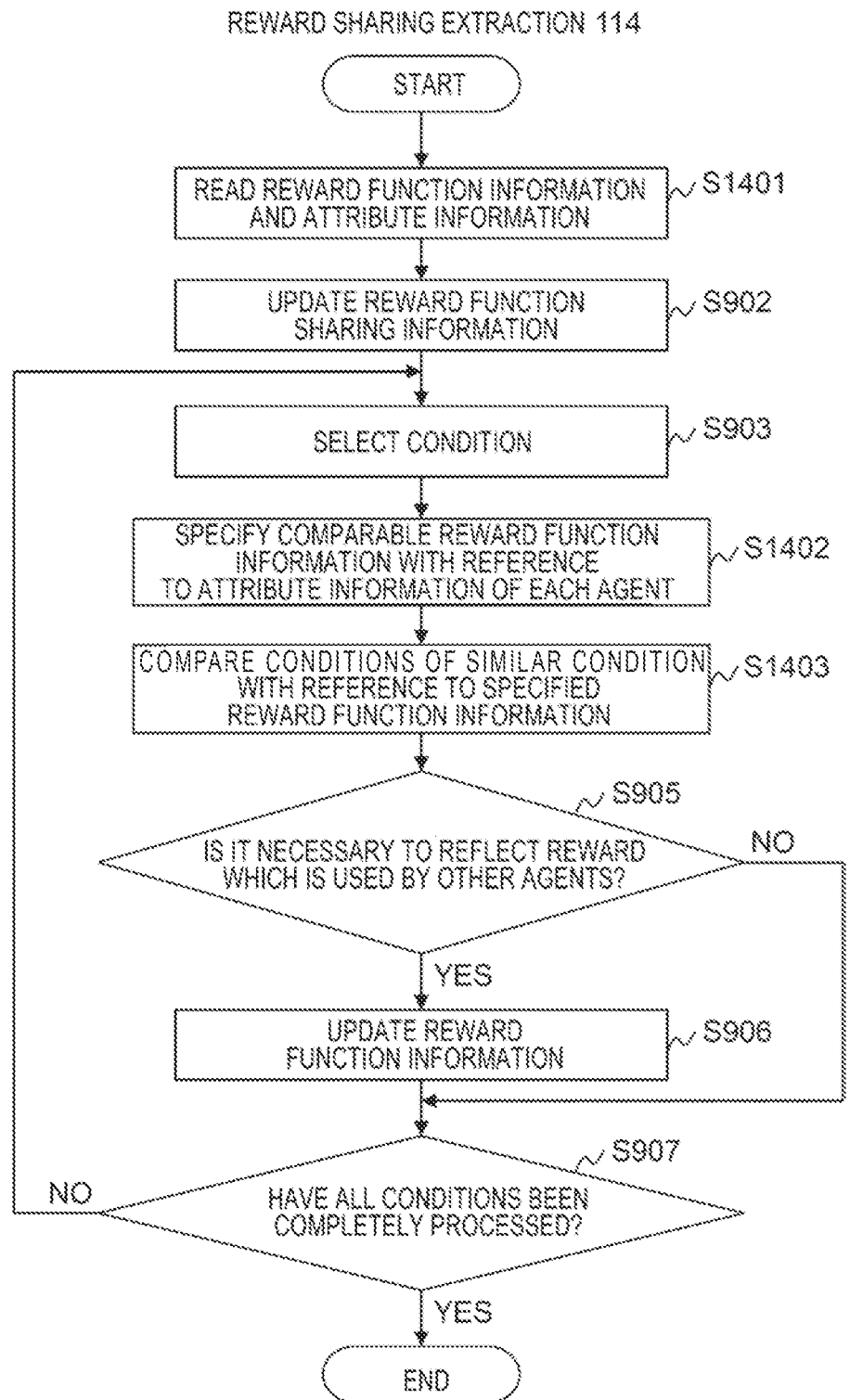

COMPUTER SYSTEM AND CONTROL METHOD

CROSS-REFERENCE TO RELATED APPLICATIONS

This application is a U.S. National Stage entry of PCT Application No: PCT/JP2016/080548 filed Oct. 14, 2016, the contents of which are incorporated herein by reference.

TECHNICAL FIELD

The present invention relates to an optimization technology of a plurality of control targets based on reinforcement learning.

BACKGROUND ART

In recent years, there have been developed technologies for analyzing an unknown relation among a large amount of information called big data. One of the objectives for analyzing the relation among such information is for optimizing a system by using an evaluation formula indicating the relation among the information.

For example, PTL 1 discloses "a master appliance includes a plurality of electric appliance agents 30a to 30e corresponding to a plurality of electric appliances; and an agent management part 37 for inputting a plurality of appliance information obtained from the plurality of electric appliances to each of the plurality of electric appliance agents 30a to 30e, and for outputting a control command to be obtained from each of the plurality of electric appliance agents 30a to 30e to the plurality of electric appliances, and for calculating a reward from a state change quantity to be obtained from the plurality of electric appliances as a result, and for updating the value function of each of the plurality of electric appliance agents 30a to 30e by using the reward as a parameter".

CITATION LIST

Patent Literature

PTL 1: JP-A-2014-99113

SUMMARY OF INVENTION

Technical Problem

In the system optimization based on the reinforcement learning, efficient processing is obtained. In the system optimization, a plurality of systems share information, so that it is possible to more efficiently perform optimization. However, when each of a plurality of systems having different objects is optimized, management using the master appliance is not possible as disclosed in PTL 1. Therefore, since individual learning devices do not cooperate with one another, it is not possible to achieve efficient reinforcement learning.

An object of the present invention is to provide a computer system and a method, by which it is possible to optimize each of a plurality of systems having different objects at a high speed.

Solution to Problem

A representative example of the invention disclosed in the present specification is as follows. That is, the invention provides a computer system that performs optimization of each of a plurality of control targets, wherein the computer system includes at least one computer including a processor and a memory connected to the processor, and manages a plurality of pieces of reward function information for defining rewards for states and actions of the control targets for each of the control targets. The plurality of pieces of reward function information includes first reward function information for defining the reward of a first control target and second reward function information for defining the reward of a second control target, and when updating the first reward function information, the processor compares the rewards of the first reward function information and the second reward function information with each other, specifies a reward, which is reflected in the first reward function information from rewards set in the second reward function information, updates the first reward function information on the basis of the specified reward, and decides an optimal action of the first control target by using the first reward function information.

Advantageous Effects of Invention

According to the present invention, rewards used for different control targets are shared, so that it is possible to achieve efficiency of individual control targets in an efficient manner. Problems, configurations, and effects, other than the above description, become apparent by the following description of examples.

BRIEF DESCRIPTION OF DRAWINGS

FIG. 1 is a diagram illustrating a configuration example of a system of an Example 1.

FIG. 2 is a diagram illustrating an overview of a process performed by a server of an Example 1.

FIG. 3 is a diagram illustrating an example of state/action information of an Example 1.

FIG. 4 is a diagram illustrating an example of objective variable information of an Example 1.

FIG. 5 is a diagram illustrating an example of reward function information of an Example 1.

FIG. 6 is a diagram illustrating an example of reward function sharing information of an Example 1.

FIG. 7 is a flowchart for explaining an example of a process performed by a reinforcement learning module of an Example 1.

FIG. 8 is a flowchart for explaining an example of a process performed by a reward relation extraction module of an Example 1.

FIG. 9 is a diagram illustrating an example of a process performed by a reward sharing module of an Example 1.

FIG. 10 is a diagram illustrating an effect of a reinforcement learning scheme of an Example 1.

FIG. 11 is a diagram illustrating a configuration example of a system of an Example 2.

FIG. 12 is a diagram illustrating an example of attribute information of an Example 2.

FIG. 13 is a diagram illustrating an overview of a process performed by a server of an Example 2.

FIG. 14 is a diagram illustrating an overview of a process performed by a reward sharing module of an Example 2.

DESCRIPTION OF EMBODIMENTS

Hereinafter, an embodiment of the present invention will be described with reference to the drawings. In each drawing, the same reference numerals are given to common elements.

FIG. 1 is a diagram illustrating a configuration example of a system of an Example 1.

The system of the Example 1 includes a server 100, a first agent 150-1, a second agent 150-2, and a third agent 150-3. The server 100 is connected to the first agent 150-1, the second agent 150-2, and the third agent 150-3 via a network 160. In the following description, when the first agent 150-1, the second agent 150-2, and the third agent 150-3 are not distinguished from one another, they are referred to as agents 150.

The network 160 includes a wide area network (WAN), a local area network (LAN) and the like. Furthermore, a connection scheme of the network 160 may be a wireless connection scheme or a wired connection scheme.

The agents 150 are control targets. The agents 150 of the present example acquire values indicating a state of an environment and perform actions according to instructions of the server 100. An object is set to each agent 150. For example, speeding-up of specific work is set as an object. In the present example, an object is managed as an objective variable. In the following description, a value of the objective variable is also referred to as an objective variable value.

In the present example, it is assumed that each agent 150 has similar action and object, but has an independent control structure. Furthermore, it is assumed that an object set in one agent 150 does not have dependency with objects set in the other agents.

The server 100 performs a reinforcement learning for deciding actions on the basis of the values acquired by the agents 150. Hereinafter, a hardware configuration and a software configuration of the server 100 will be described.

The server 100 includes an arithmetic device 101, a main storage device 102, a sub-storage device 103, a network interface 104, an input device 105, and an output device 106. The hardwares are connected to one another via an internal bus and the like.

The arithmetic device 101 performs an arithmetic process according to programs. The arithmetic device 101, for example, includes a central processing unit (CPU), a graphics processing unit (GPU) and the like. The arithmetic device 101 operates as a module for performing predetermined functions by executing programs stored in the main storage device 102.

The main storage device 102 stores the programs to be executed by the arithmetic device 101 and information. Furthermore, the main storage device 102 includes work areas temporarily used by the program. The main storage device 102, for example, includes a volatile storage device such as a dynamic random access memory (DRAM), in which an access speed is high. The programs stored in the main storage device 102 will be described later.

The sub-storage device 103 permanently stores data. The sub-storage device 103, for example, includes a nonvolatile memory such as a magnetic storage device and a flash memory, in which capacity is large. Information stored in the sub-storage device 103 will be described later.

The programs stored in the main storage device 102 may be stored in the sub-storage device 103. In this case, the arithmetic device 101 reads the programs from the sub-storage device 103 and loads the programs to the main storage device 102.

The network interface 104 is an interface for connecting with other devices via a network. The input device 105 is a device for inputting data to the server 100, and for example, includes a mouse, a keyboard, a touch panel and the like.

The output device 106 is a device for outputting data such as processing results, and for example, includes a display, a touch panel and the like.

Hereinafter, the programs stored in the main storage device 102 and the information stored in the sub-storage device 103 will be described.

The main storage device 102 stores programs for implementing a reinforcement learning module 111, a reward relation extraction module 112, a communication module 113, and a reward sharing extraction 114. The main storage device 102 stores a program such as an OS, but since it is not directly related to the present example, it is omitted.

The communication module 113 controls communication with the agents 150.

The reinforcement learning module 111 performs the reinforcement learning. Details of a process performed by the reinforcement learning module 111 will be described using FIG. 7.

The reward relation extraction module 112 specifies factors (conditions) having an association with objective variable values by performing a statistical process using state/action information 121, and updates rewards on the basis of the factors (conditions). Details of a process performed by the reward relation extraction module 112 will be described using FIG. 8.

The reward sharing extraction 114 controls sharing of rewards among the agents 150. Details of a process performed by the reward sharing extraction 114 will be described using FIG. 9.

The reinforcement learning module 111, the reward relation extraction module 112, and the communication module 113 exist in each agent 150.

The sub-storage device 103 stores the state/action information 121, objective variable information 122, reward function information 123, and reward function sharing information 124.

The state/action information 121 is information for managing states and actions of the agents 150 in units of episodes. Details of the state/action information 121 will be described using FIG. 3. The episode indicates a series of operation units from an initial state to an terminal state.

The objective variable information 122 is information for managing objective variable values corresponding to the objects set in the agents 150. The server 100 performs the reinforcement learning, thereby learning a combination and the like of optimal actions such that the objective variable values are optimal values. For example, a combination of actions for increasing the objective variable value, a combination of actions for decreasing the objective variable value, a combination of actions for converging the objective variable value to a predetermined setting value, and the like are learned. Details of the objective variable information 122 will be described using FIG. 4.

The reward function information 123 is information on reward functions used when the reinforcement learning module 111 decides actions. Details of the reward function information 123 will be described using FIG. 5.

The reward function sharing information 124 is information for managing reward functions of the agents 150. Details of the reward function sharing information 124 will be described using FIG. 6.

The state/action information 121, the objective variable information 122, and the reward function information 123 exist in each agent.

FIG. 2 is a diagram illustrating an overview of a process performed by the server 100 of the Example 1.

In the present example, it is assumed that the reinforcement learning for each agent 150 is asynchronously performed. Each reinforcement learning may be serially performed.

FIG. 2 illustrates a state in which a reinforcement learning for the first agent 150-1 and a reinforcement learning for the second agent 150-2 are asynchronously performed. Even though the number of reinforcement learnings asynchronously performed is three or more, its configurations are similar to one another.

The communication module 113 acquires values of current states from the agents 150 from the start of an episode to the end of the episode, and acquires objective variable values when the episode is ended. The communication module 113 transmits the acquired state values and objective variable values to the reinforcement learning module 111. The reinforcement learning module 111 performs a reinforcement learning based on the values of the states, and the values of actions, and the reward function information 123, thereby deciding actions. The communication module 113 transmits the actions decided by the reinforcement learning module 111 to the agents 150.

The reinforcement learning module 111 registers the values of the state and the actions in the state/action information 121, and registers the objective variable values in the objective variable information 122. Furthermore, the reinforcement learning module 111 calls the reward relation extraction module 112 at a predetermined timing.

The reward relation extraction module 112 performs a statistical process using the state/action information 121 and the objective variable information 122, thereby updating the reward function information 123 on the basis of an association between factors (conditions) for giving a reward and the objective variable values.

The reward sharing extraction 114 registers the updated reward function information 123 in the reward function sharing information 124. Furthermore, the reward sharing extraction 114 determines whether there is a reward with a high statistical confidence with reference to the reward function information 123 used for the reinforcement learning for other agents 150. When there is the reward with a high statistical confidence, the reward sharing extraction 114 corrects the reward function information 123 by reflecting the reward in the reward function information 123.

The reinforcement learning module 111 performs the reinforcement learning by using the reward function information 123 corrected by the aforementioned procedure.

FIG. 3 is a diagram illustrating an example of the state/action information 121 of the Example 1.

The state/action information 121 includes an entry constituted by an episode 301, a time 302, a state 303, and an action 304. One entry corresponds to one episode.

The episode 301 is identification information for uniquely identifying episodes. Until an episode is started and then is ended, one or more actions are performed. Consequently, one or more entries with the same episode 301 are included in the state/action information 121.

The time 302 is a time of a process for deciding an action in an episode. In the time 302, for example, a time, at which the agent 150 has acquired a value of a state, or a time, at which an action has been performed, is set.

The state 303 is a value of a state. In the state 303, columns exist by the number of states which are acquired by the agent 150. A state variable is set for each type of the state. FIG. 3 illustrates that three states are acquired.

The action 304 is a value of an action. In the action 304, columns exist by the number of actions which are decided in a reinforcement learning. An action variable is set for each type of the action. FIG. 3 illustrates that one action is performed.

The uppermost entry of FIG. 3 is an episode corresponding to an episode E1, and indicates that at a time T1, a state variable S1 is S11, a state variable S2 is S23, and a state variable S3 is S32, and an action corresponding to an action variable A11 is performed. Furthermore, the episode E1 indicates that an action is performed at each of times T1, T2, T3, T4, and T5.

FIG. 4 is a diagram illustrating an example of the objective variable information 122 of the Example 1.

The objective variable information 122 includes an entry constituted by an episode 401 and an objective variable 402. One entry corresponds to one objective variable. In the present example, an object is set for each control target. For example, when an operation for holding a thing from a start position is managed as one episode, a time until the object is held is set as an object.

The episode 401 is identical to the episode 301. The objective variable 402 is an objective variable value corresponding to an object set in a control target.

FIG. 5 is a diagram illustrating an example of the reward function information 123 of the Example 1.

The reward function information 123 includes an entry constituted by a condition ID 501, a variable name 502, a value 503, a reward 504, and a confidence value 505.

The condition ID 501 is identification information for uniquely identifying conditions.

The variable name 502 is a name of a state variable and an action variable. The value 503 is a specific value of a variable corresponding to the variable name 502. A condition, in which a reward is given, is defined as a combination of values of one or more variables (the state variable and the action variable). The variable name 502 and the value 503 may be managed as a condition 602 (see FIG. 6) similarly to the reward function sharing information 124.

The reward 504 is a reward given when the conditions defined by the variable name 502 and the value 503 are identical to each other.

The confidence value 505 is a value indicating statistical confidence of a value set in the reward 504.

A condition, in which the condition ID 501 is "C1", indicates that the state variable S1 is S11, the state variable S2 is S23, and the action variable A1 is A11. An episode coinciding with the condition means that an objective variable value is higher than other episodes by 0.1. Furthermore, the condition means that the random occurrence probability of a difference of the aforementioned objective variable values is equal to or less than 5%.

FIG. 6 is a diagram illustrating an example of the reward function sharing information 124 of the Example 1.

The reward function sharing information 124 includes an entry constituted by an agent ID 601, a condition 602, a reward 603, and a confidence value 604.

The agent ID 601 is identification information for uniquely identifying the agents 150.

The condition 602 stores names and values of variables for defining one condition. The condition 602 may be divided into the variable name 502 and the value 503 for management, similarly to the reward function information 123.

The reward 603 is identical to the reward 504. The confidence value 604 is identical to the confidence value 505.

FIG. 7 is a flowchart for explaining an example of a process performed by the reinforcement learning module 111 of the Example 1.

When the reinforcement learning module 111 starts a process, the reinforcement learning module 111 waits for the transmission of the values of states from the agents 150. When the values of the states are received from the agents 150 via the communication module 113 (step S701), the reinforcement learning module 111 refers to the reward function information 123 (step S702), and updates a weight Q (step S703). Specifically, the following process is performed.

The reinforcement learning module 111 selects an action according to an arbitrary strategy.

The reinforcement learning module 111 refers to the reward function information 123 on the basis of the values of the states and the value of the action, and specifies a suitable condition. Moreover, the reinforcement learning module 111 calculates an average value or a sum value of the rewards 504 of the specified condition as a reward.

The reinforcement learning module 111 acquires values of states after the execution of the action from the agents 150.

Moreover, the reinforcement learning module 111 updates the weight Q by using the following formula (1).

[Formula 1]

$$Q(S_{T-1}, A) \leftarrow Q(S_{T-1}, A) + \alpha [R_T + \Gamma \text{ MAX } Q(S_T, A) - Q(S_{T-1}, A)] \quad (1)$$

In the formula above, A denotes an action, $S_{T-1}$ denotes a state before the action is performed, and $S_T$ denotes a state after the action is performed. $\alpha$ denotes a learning coefficient and is a parameter in a range of $0 < \alpha \leq 1$. $\Gamma$ denotes a discount rate and is a parameter in a range of $0 < \Gamma \leq 1$. Q ($S_T$, A) denotes a weight when the action A is performed in the state $S_{T-1}$.

The reinforcement learning module 111 performs a similar process with respect to all acquired actions.

Next, the reinforcement learning module 111 selects an action on the basis of the weight Q (step S704), and transmits an execution instruction of the selected action to the agent 150 via the communication module 113 (step S705). As described above, the reinforcement learning module 111 can decide an optimal action of a control target on the basis of the weight Q. As a selection method of the action, for example, a method is considered to select an action in which the weight Q is maximum. The present example is not limited to the selection method of the action.

Next, the reinforcement learning module 111 determines whether to update the reward function information 123 (step S706). In the present example, it is determined whether an update condition is satisfied. The update condition, for example, includes the following condition.

An update method, in which the number of generated episodes is employed as a standard, is considered. Specifically, when the number of generated episodes is equal to or more than a predetermined threshold value, the reinforcement learning module 111 updates the reward function information 123.

Furthermore, an update method, in which a trend of data is employed as a standard, is also considered. Specifically, when the value of the state variable, the action variable, or the objective variable is shifted from a past distribution by a predetermined threshold value or more, the reinforcement learning module 111 updates the reward function information 123.

Furthermore, an update method, in which the objective variable value is employed as a standard, is also considered.

Specifically, when it is detected that the objective variable value is not optimized by using current reward function information 123, the reinforcement learning module 111 updates the reward function information 123.

Furthermore, when an update instruction of the reward function information 123 is explicitly received from a user, the reinforcement learning module 111 updates the reward function information 123.

When it is determined not to update the reward function information 123, the reinforcement learning module 111 proceeds to step S708.

When it is determined to update the reward function information 123, the reinforcement learning module 111 calls the reward relation extraction module 112 (step S707), and then proceeds to step S708.

In step S708, the reinforcement learning module 111 determines whether an end flag is set (step S708). For example, when an end instruction is received from a user or when an end instruction is received from the agents 150, it is determined that the end flag is not set.

When it is determined that the end flag is not set, the reinforcement learning module 111 returns to step S701 and waits for the transmission of the values of the states from the agents 150.

When it is determined that the end flag is set, the reinforcement learning module 111 ends the process.

In addition, when the objective variable values are received from the agents 150, the reinforcement learning module 111 registers the objective variable value in the objective variable information 122 together with episode identification information.

FIG. 8 is a flowchart for explaining an example of a process performed by the reward relation extraction module 112 of the Example 1.

The reward relation extraction module 112 starts the following process when it is called from the reinforcement learning module 111. In the following description, the reinforcement learning module 111 having called the reward relation extraction module 112 is also referred to as a target reinforcement learning module 111.

The reward relation extraction module 112 generates combinations of variables (the state variable/the action variable) with reference to the state/action information 121 which is used by the target reinforcement learning module 111 (step S801).

Specifically, the reward relation extraction module 112 generates a subset from a set employing the state variable and the action variable as elements. When an upper limit is set in the number of combinations, any one of a combination having a large number of elements and a combination having a small number of elements is preferentially generated. Furthermore, variables included in the elements may be designated in advance and only a combination including the variables may be generated.

The reward relation extraction module 112 selects a combination of target variables from the generated combinations of the variables (step S802).

Next, the reward relation extraction module 112 selects values of the selected variables with reference to the state/action information 121 (step S803). A combination of the values of the variables is set as a condition.

A method for selecting the values of the variables is variously considered. For example, a method is considered to select values from values set in the state/action information 121. Furthermore, as another method, it is considered to select arbitrary values from a range of obtainable values of the variables. In addition, when the obtainable values of the variables are continuous values, it is sufficient if the range is divided into a plurality of ranges on the basis of clustering and the like and values are selected from the divided ranges.

Next, the reward relation extraction module 112 calculates a feature quantity of an episode on the basis of the set condition (step S804).

In the present example, the reward relation extraction module 112 calculates a probability, which includes an action coinciding with the set condition, as the feature quantity for each episode. For example, when there is a condition that the state variable S1 is S11, the state variable S2 is S23, and the action variable A1 is A11, since the number of actions of the episode E1 is five and the number of actions coinciding with the condition is one, the feature quantity of the episode is 20%. The reward relation extraction module 112 generates a feature quantity vector having a component having the same number as that of episodes. The aforementioned feature quantity is an example and the present invention is not limited thereto.

Next, the reward relation extraction module 112 calculates a value indicating an association between the condition and an objective variable value (step S805). The value indicating the association between the condition and the objective variable value is variously considered. In the present example, the value indicating the association between the condition and the objective variable value is calculated on the basis of the following method as an example.

The reward relation extraction module 112 plots a point, which employs a feature quantity and an objective variable value of each episode as components, on a two-dimensional space in which a horizontal axis denotes the feature quantity and a vertical axis denotes the objective variable value. The reward relation extraction module 112 divides the two-dimensional space at a center value of the feature quantity. A region where the feature quantity is smaller than the center value is defined as a first region, and a region where the feature quantity is equal to or more than the center value is defined as a second region.

The reward relation extraction module 112 determines whether there is a statistical difference between the objective variable value of an episode included in the first region and the objective variable value of an episode included in the second region. The statistical difference includes a difference between average values of objective variable values included in each region, and the like.

When there is the statistical difference between the objective variable values of the two regions, since the number of actions coinciding with the condition set in step S802 and step S803 is large, the objective variable values become large. Consequently, since the number of actions coinciding with the set condition is increased, it is probable that the speed of a reinforcement learning will be improved.

When it is determined that there is the statistical difference between the objective variable values of the two regions, the reward relation extraction module 112 proceeds to step S806. On the other hand, when it is determined that there is no statistical difference between the objective variable values of the two regions, the reward relation extraction module 112 proceeds to step S807 without performing step S806.

The above is an explanation for the process of step S805.

Next, the reward relation extraction module 112 updates the reward function information 123 which is used by the target reinforcement learning module 111 (step S806). Specifically, the following process is performed.

The reward relation extraction module 112 calculates the difference between the objective variable values of the two regions as a new reward, and calculates a significant probability of the difference between the objective variable values of the two regions as a confidence value.

The reward relation extraction module 112 searches for an entry, in which the combination of the variable name 502 coincides with the combination of the variables selected in step S802 and the value 503 coincides with the combination of the values selected in step S803, with reference to the reward function information 123 which is used by the target reinforcement learning module 111. That is, an entry coinciding with the set condition is searched. The reward relation extraction module 112 sets the calculated reward and confidence value in the reward 504 and the confidence value 505 of the searched entry.

The above is an explanation for the process of step S806.

Next, the reward relation extraction module 112 determines whether combinations of values of all variables have been completely processed (step S807).

When it is determined that the combinations of the values of all variables have not been completely processed, the reward relation extraction module 112 returns to step S803 and performs a similar process with respect to combinations of new values.

When it is determined that the combinations of the values of all variables have been completely processed, the reward relation extraction module 112 determines whether the combinations of all variables have been completely processed (step S808).

When it is determined that the combinations of all variables have not been completely processed, the reward relation extraction module 112 returns to step S802 and performs a similar process with respect to combinations of new variables.

When it is determined that the combinations of all variables have been completely processed, the reward relation extraction module 112 calls the reward sharing extraction 114 (step S809). Thereafter, the reward relation extraction module 112 ends the process. In addition, the reward relation extraction module 112 inputs the identification information of the agents 150 to the reward sharing extraction 114.

In addition, the reward relation extraction module 112 may perform the aforementioned process by using all entries registered in the state/action information 121, or may perform the aforementioned process by using 100 episodes in which an occurrence time is near a current time.

In addition, the reward relation extraction module 112 may acquire a learning effect from the reinforcement learning module 111, calculate a contribution value for an objective variable, and increase the value of the confidence value 505 of a reward in which the contribution value is low. In this way, only a reward, which contributes to speeding-up of a reinforcement learning, can be controlled to be shared.

FIG. 9 is a diagram illustrating an example of a process performed by the reward sharing extraction 114 of the Example 1.

The reward sharing extraction 114 starts a process to be described below when it is called from the reward relation extraction module 112. In the following description, the reward relation extraction module 112 having called the reward sharing extraction 114 is also referred to as a target reward relation extraction module 112.

The reward sharing extraction 114 reads reward function information 123 which is used by the target reward relation extraction module 112 (step S901), and updates reward function sharing information 124 (step S902). Specifically, the following process is performed.

The reward sharing extraction 114 reads the reward function information 123 on the basis of the input identification information of the agents 150. The reward sharing extraction 114 selects one entry from the read reward function information 123, and searches for an entry in which the agent ID 601 coincides with the input identification information of the agents 150 and the condition 602 coincides with the condition defined by the variable name 502 and the value 503 of the selected entry.

When there is no entry, the reward sharing extraction 114 adds an entry to the reward function sharing information 124, and sets the identification information of the agents 150 in the agent ID 601 of the added entry. The reward sharing extraction 114 sets, in the condition 602 of the added entry, the condition defined by the variable name 502 and the value 503 of the selected entry. Furthermore, the reward sharing extraction 114 sets the values of the reward 504 and the confidence value 505 of the selected entry in the reward 603 and the confidence value 604 of the added entry.

When there is an entry, the reward sharing extraction 114 overwrites the values of the reward 504 and the confidence value 505 of the selected entry on the reward 603 and the confidence value 604 of the entry.

The reward sharing extraction 114 performs a similar process with respect to all entries of the reward function information 123.

In addition, the aforementioned update method of the reward function sharing information 124 is an example and the prevent invention is not limited thereto. For example, update methods (1), (2), and (3) may also be used.

(1) When there is an entry, the reward sharing extraction 114 performs overwriting if the value of the confidence value 505 of the selected entry is larger than the value of the confidence value 604 of the searched entry or if the value of the reward 504 of the selected entry is larger than the value of the reward 603 of the searched entry.

(2) The reward sharing extraction 114 registers, in the reward function sharing information 124, only an entry in which the value of the confidence value 505 is larger than a threshold value.

(3) The reward sharing extraction 114 performs no overwriting for past reward function information 123 and registers the latest reward function information 123 in the reward function sharing information 124 as is. It is assumed that the reward function information 123 stores a history of the reward function sharing information 124. In this case, the entry of the reward function sharing information 124 may include a column indicating a time at which the reward function information 123 has been updated.

The above is an explanation for the process of step S902.

Next, the reward sharing extraction 114 selects a target condition (entry) from conditions (entries) set in the read reward function information 123 (step S903).

Next, the reward sharing extraction 114 compares a condition (entry) of reward function information 123 different from the read reward function information 123 with the selected condition (entry) (step S904), and determines whether it is necessary to reflect a reward which is used by other agents 150 (step S905). Specifically, the following process is performed.

The reward sharing extraction 114 searches for an entry in which the condition 602 coincides with the condition defined by the variable name 502 and the value 503 of the selected entry. In addition, all entries of the reward function information 123 may be used as a search range or an entry of the closest period may be used as a search range. The search range is narrowed down to the entry of the closest period, so that it is possible to enhance following property for a change in an environment. In addition, the reward function information 123 different from the read reward function information 123 may be any one of reward function information 123 managed by the other agents 150 and past reward function information 123 of the same agent 150.

The reward sharing extraction 114 determines whether there is an entry in which the value of the confidence value 604 of the searched entry is larger than the value of the confidence value 505 of the selected entry. When there is an entry satisfying the aforementioned condition, the reward sharing extraction 114 determines that it is necessary to reflect the reward which is used by the other agents 150.

The above is an explanation for the processes of step S904 and step S905.

When it is determined that it is not necessary to reflect the reward which is used by the other agents 150, the reward sharing extraction 114 proceeds to step S907.

When it is determined that it is necessary to reflect the reward which is used by the other agents 150, the reward sharing extraction 114 updates the transmitted reward function information 123 (step S906).

Specifically, the reward sharing extraction 114 sets the values of the reward 603 and the confidence value 604 of the searched entry in the values of the reward 504 and the confidence value 505 of the selected entry. When there are a plurality of searched entries, it is assumed to set the reward 603 and the confidence value 604 of an entry having the largest confidence value 604.

Next, the reward sharing extraction 114 determines whether all conditions of the read reward function information 123 have been completely processed (step S907).

When it is determined that all conditions of the read reward function information 123 have not been completely processed, the reward sharing extraction 114 returns to step S903 and performs a similar process with respect to combinations of new conditions.

When it is determined that all conditions of the read reward function information 123 have been completely processed, the reward sharing extraction 114 ends the process.

As described above, the reward relation extraction module 112 updates the reward function information 123 on the basis of the results of the reinforcement learning and the reward sharing extraction 114 updates reward function information 123 on the basis of reward function information 123 which are used by other agents 150. The reinforcement learning module 111 performs the reinforcement learning by using the updated reward function information 123.

The Example 1 has a configuration in which one server 100 includes a plurality of reinforcement learning modules 111 and the like; however, the present invention is not limited thereto. A computer system, in which the server 100 is provided to each control target, may be provided. Furthermore, the server 100 may be a physical computer or a virtual computer. Furthermore, the modules may be integrated into one module or one module may be divided into a plurality of modules.

FIG. 10 is a diagram illustrating an effect of the reinforcement learning scheme of the Example 1.

FIG. 10 is a graph illustrating the number of times, by which the reinforcement learning is performed, when the number of the agents 150 is ten. In the graph, a horizontal axis denotes the number of times by which the reinforcement learning is performed and a vertical axis denotes a value of an objective variable Y. A normal scheme indicates a conventional reinforcement learning, and a reward sharing scheme indicates the reinforcement learning of the Example 1. It is assumed to perform a reinforcement learning aiming at optimization in which the value of the objective variable Y is converged to a setting value "1".

As illustrated in FIG. 10, when the reinforcement learning scheme of the Example 1 is used, it is possible to reduce the number of times by which the reinforcement learning is performed. That is, it is possible to perform an efficient reinforcement learning. When the reinforcement learning is efficiently performed, it is possible to reduce a time required for the reinforcement learning.

Example 2

The Example 2 is different from the Example 1 in that a reward to be shared is decided on the basis of attributes of data. Hereinafter, the Example 2 will be described while focusing on the difference with the Example 1.

FIG. 11 is a diagram illustrating a configuration example of a system of an Example 2.

Devices constituting the system are identical to those of the Example 1. Furthermore, a hardware configuration of the server 100 of the Example 2 is identical to that of the server 100 of the Example 1. Furthermore, programs stored in the main storage device 102 of the server 100 are identical to those of the Example 1. The Example 2 is different from the Example 1 in that the sub-storage device 103 of the server 100 includes attribute information 1101 in addition to the state/action information 121, the objective variable information 122, the reward function information 123, and the reward function sharing information 124.

The attribute information 1101 is information for managing attributes of values of states acquired by each agent 150. Details of the attribute information 1101 will be described using FIG. 12.

FIG. 12 is a diagram illustrating an example of the attribute information 1101 of the Example 2.

The attribute information 1101 includes an entry constituted by a variable name 1201, an index 1202, and an attribute 1203.

The variable name 1201 is a name of a variable indicating a state. The index 1202 is an index set in an attribute set in a variable corresponding to the variable name 1201. For example, in the case of a variable in which two attributes are set, there are two entries with the same variable name 1201 and "1" and "2" are set in the index 1202 of the respective entries. The attribute 1203 is an attribute of a variable.

The attribute information 1101 may be set by a user in advance or may be set on the basis of an analysis result of a behavior and the like of the system.

FIG. 13 is a diagram illustrating an overview of a process performed by the server of the Example 2.

A process performed by the reinforcement learning module 111 and a process performed by the reward relation extraction module 112 of the Example 2 are identical to those of the Example 1.

In the Example 2, a process performed by the reward sharing extraction 114 partially differs. Specifically, the reward sharing extraction 114 specifies conditions, which are defined by similar variables, on the basis of the attribute information 1101, compares rewards of the specified conditions with each other, and corrects the reward function information 123 on the basis of the comparison result.

FIG. 14 is a diagram illustrating an example of a process performed by the reward sharing extraction 114 of the Example 2.

The reward sharing extraction 114 reads reward function information 123 and attribute information 1101 which are used by the target reward relation extraction module 112 (step S1401), and updates reward function sharing information 124 (step S902).

Next, the reward sharing extraction 114 selects a target condition (entry) from conditions (entries) set in the read reward function information 123 (step S903).

Next, the reward sharing extraction 114 specifies comparable reward function information 123 by performing a filtering process with reference to the attribute information 1101 read in step S1401 and attribute information 1101 which is used by other agents 150 (step S1402).

Specifically, the reward sharing extraction 114 searches for reward function information 123 including similar states with reference to the attribute information 1101 read in step S1401 and the attribute information 1101 which is used by the other agents 150. For example, the reward sharing extraction 114 calculates a distance between variables corresponding to states of each reward function information 123 and searches for reward function information 123 in which the distance is equal to or less than a threshold value.

In addition, the distance may be calculated using variables corresponding to all states set in the read reward function information 123, or may be calculated using only variables associated with the selected condition.

In addition, the calculation method of the distance of the reward function information 123 based on an attribute may be dynamically changed on the basis of a learning result. For example, even in similar conditions, in the case of a reward in which contribution to an objective variable value is low, a method is considered to set a weight coefficient such that the distance becomes long.

Next, the reward sharing extraction 114 compares a condition (entry) of the specified reward function information 123 with the selected condition (entry) (step S1403), and determines whether it is necessary to reflect a reward which is used by the other agents 150 (step S905). Specifically, the following process is performed.

On the basis of the attribute information 1101, the reward sharing extraction 114 specifies a condition 602 defined from a variable similar to a variable name 502 of the selected entry, or searches for an entry in which a value of the similar variable coincides with a value 503 of the selected entry.

The reward sharing extraction 114 determines whether there is an entry in which a value of a confidence value 604 of the searched entry is larger than a value of a confidence value 505 of the selected entry. When there is an entry satisfying the aforementioned condition, the reward sharing extraction 114 determines that it is necessary to reflect the reward which is used by the other agents 150.

When it is determined that it is not necessary to reflect the reward which is used by the other agents 150, the reward sharing extraction 114 proceeds to step S907.

When it is determined that it is necessary to reflect the reward which is used by the other agents 150, the reward sharing extraction 114 updates the transmitted reward function information 123 (step S906).

Next, the reward sharing extraction 114 determines whether all conditions of the read reward function information 123 have been completely processed (step S907).

When it is determined that all conditions of the read reward function information 123 have not been completely processed, the reward sharing extraction 114 returns to step S903 and performs a similar process with respect to combinations of new conditions.

According to the Example 2, even when names of variables are different from one another, rewards of conditions defined from variables having similar attributes are compared with one another, so that it is possible to share the variables. Consequently, since it is not necessary to perform control for allowing variable names among control targets to coincide with one another, so that it is possible to reduce management cost.

In addition, the present invention is not limited to the aforementioned examples and includes various modification examples. Furthermore, for example, the aforementioned examples have been described for easy understanding of the present invention by describing configurations in detail, and are not limited to essentially having all of the configurations described above. Furthermore, some of the configurations of the examples can be added to other configurations, can be deleted, and can be replaced with other configurations.

Furthermore, some or the whole of the aforementioned each configuration, function, processing unit, processing means and the like, for example, may be implemented with hardware by design and the like with an integrated circuit. Furthermore, the present invention can also be implemented by program codes of software for performing the functions of the examples. In this case, a storage medium recording the program codes is provided to a computer and a CPU included in the computer reads the program codes stored in the storage medium. In this case, the program codes itself read from the storage medium performs the functions of the aforementioned examples, so that the program codes itself and the storage medium recording the program codes constitute the present invention. A storage medium for supplying such program codes, for example, uses a flexible disk, a CD-ROM, a DVD-ROM, a hard disk, a solid state drive (SSD), an optical disk, a magneto-optic disk, a CD-R, a magnetic tape, a nonvolatile memory card, a ROM and the like.

Furthermore, program codes for performing the functions described in the present examples, for example, can be implemented in a wide range of programs or script languages such as an assembler, a C/C++, a perl, a Shell, a PHP, and a Java.

Moreover, the program codes of the software for performing the functions of the examples may be distributed via a network to be stored in a storage means such as a hard disk and a memory of a computer or a storage medium such as a CD-RW and a CD-R, and a CPU included in the computer may read and execute the program codes stored in the storage means and the storage medium.

In the aforementioned examples, control lines and information lines are drawn for the necessity of description, and all control lines and information lines are not always drawn according to products. All configurations may be connected to one another.

The invention claimed is:

1. A computer system that performs optimization of each of a plurality of control targets, the computer system comprising:
at least one computer including a processor and a memory connected to the processor, wherein
a plurality of pieces of reward function information for defining rewards for states and actions of the control targets is managed for each of the control targets, wherein each reward function information includes entries indicating conditions defined by at least one of a state and an action, the reward given when each condition is satisfied, and confidence values indicating statistical confidence of each reward,
the plurality of pieces of reward function information are included in a first reward function table for defining rewards of a first control target and a second reward function table for defining rewards of a second control target, and
when updating the first reward function table, the processor,
compares the rewards of the first reward function table and the second reward function table with each other, wherein said comparison comprises:
specifying a first entry of the first reward function table and a second entry of the second reward function table with reference to a condition of the first reward function table and a similar condition of the second reward function table,
comparing the first entry specified from the first reward function table with the second entry specified from the second reward function table, and
determining that the confidence value of the second entry specified from the second reward function table is larger than the confidence value of the first entry specified from the first reward function table,
specifies a reward, which is reflected in the first reward function table from rewards set in the second reward function table, wherein specifying the reward comprises:
in response to the determining that the confidence value of the second entry is larger than the confidence value of the first entry, determining to allow the reward included in the second entry specified from the second reward function table to be reflected as the reward included in the first entry specified from the first reward function table,
updates the first reward function table on the basis of the specified reward, wherein updating the first reward function table comprises:
in response to determining to allow the reward function of the second entry to be reflected in the first entry, setting the reward included in the second entry specified from the second reward function table as the reward for the first entry specified from the first reward function information, and
decides an optimal action of the first control target by reinforcement learning using the updated first reward function table and transmits execution instructions to the first control target including the decided optimal action, wherein the first control target executes the execution instructions; and
calculates a contribution value indicating a magnitude of contribution, of the reward included in the first entry, to an objective variable value, and updates the confidence value included in the first entry by increasing the confidence value included in the first entry when the magnitude of contribution is below a threshold.

2. The computer system according to claim 1, wherein
the at least one computer manages attribute information for managing an attribute of a state constituting a condition of the plurality of pieces of reward function information
the processor selects the first entry from the first reward function table, specifies the second entry, in which the condition is similar to the condition included in the first entry is set, from entries included in the second reward function table on the basis of the attribute information.

3. The computer system according to claim 2, wherein the processor decides a combination of optimal actions of the first control target by using the first reward function table, calculates an association value indicating an association between the condition and the objective variable value for defining the optimal actions of the first control target, and calculates the confidence value on the basis of the association value.

4. The computer system according to claim 1, wherein the reinforcement learning
receives one or more states from the first control target,
refers to the updated first reward function table on the basis of the received states and actions to specify a condition, from the first reward function table, for the received states and actions,
determines a reward for the specified condition from the first reward function table,
updates weights for the received states and actions, and
decides the optimal action based on the updated weights.

5. A control method in a computer system that performs optimization of each of a plurality of control targets, the computer system including at least one computer including a processor and a memory connected to the processor, a plurality of pieces of reward function information for defining rewards for states and actions of the control targets being managed for each of the control targets, each reward function information including an entry indicating conditions defined by at least one of a state and an action, the reward given when each condition is satisfied, and confidence values indicating statistical confidence of each reward, the plurality of pieces of reward function information including first reward function table for defining rewards of a first control target and second reward function table for defining rewards of a second control target, the control method comprising:
a first step in which, when updating the first reward function table, the processor compares the rewards of the first reward function table and the second reward function table with each other, specifies a reward, which is reflected in the first reward function table from rewards set in the second reward function table; wherein the first step includes
specifying a first entry of the first reward function table and a second entry of the second reward function table with reference to a condition of the first reward function table and a similar condition of the second reward function table,
comparing the first entry specified from the first reward function table with the second entry specified from the second reward function table,
determining that the confidence value of the second entry specified from the second reward function table is larger than the confidence value of the first entry specified from the first reward function table, and
in response to the determining that the confidence value of the second entry is larger than the confidence value of the first entry, determining to allow the reward included in the second entry specified from the second reward function table to be reflected as the reward included in the first entry specified from the first reward function table;
a second step in which the processor updates the first reward function table on the basis of the specified reward, wherein the second step includes, in response to determining to allow the reward function of the second entry to be reflected in the first entry, setting the reward included in the second entry specified from the second reward function table as the reward for the first entry specified from the first function table; and
a third step in which the processor decides an optimal action of the first control target by reinforcement learning using the updated first reward function table and transmits execution instructions to the first control target including the decided optimal action, wherein the first control target executes the execution instructions; and
a step in which the processor calculates a contribution value indicating a magnitude of contribution, of the reward included in the first entry, to an objective variable value, and updates the confidence value included in the first entry by increasing the confidence value included in the first entry when the magnitude of contribution is below a threshold.

6. The control method according to claim 5, wherein
the at least one computer manages attribute information for managing an attribute of a state constituting a condition of the plurality of pieces of reward function information, and
the first step includes:
a step in which the processor selects the first entry from the first reward function table, and
a step in which the processor specifies the second entry, in which the condition is similar to the condition included in the first entry is set, from entries included in the second reward function table on the basis of the attribute information.

7. The control method according to claim 6, further comprising:
a step in which the processor decides a combination of optimal actions of the first control target by using the first reward function table, and calculates an association value indicating an association between the condition and the objective variable value for defining the optimal actions of the first control target; and
a step in which the processor calculates the confidence value on the basis of the association value.

* * * * *